Feb. 9, 1932.  J. A. WINTROATH  1,844,618
BEARING CONSTRUCTION FOR TURBINE IRRIGATION PUMPS
Filed July 30, 1925  3 Sheets-Sheet 1
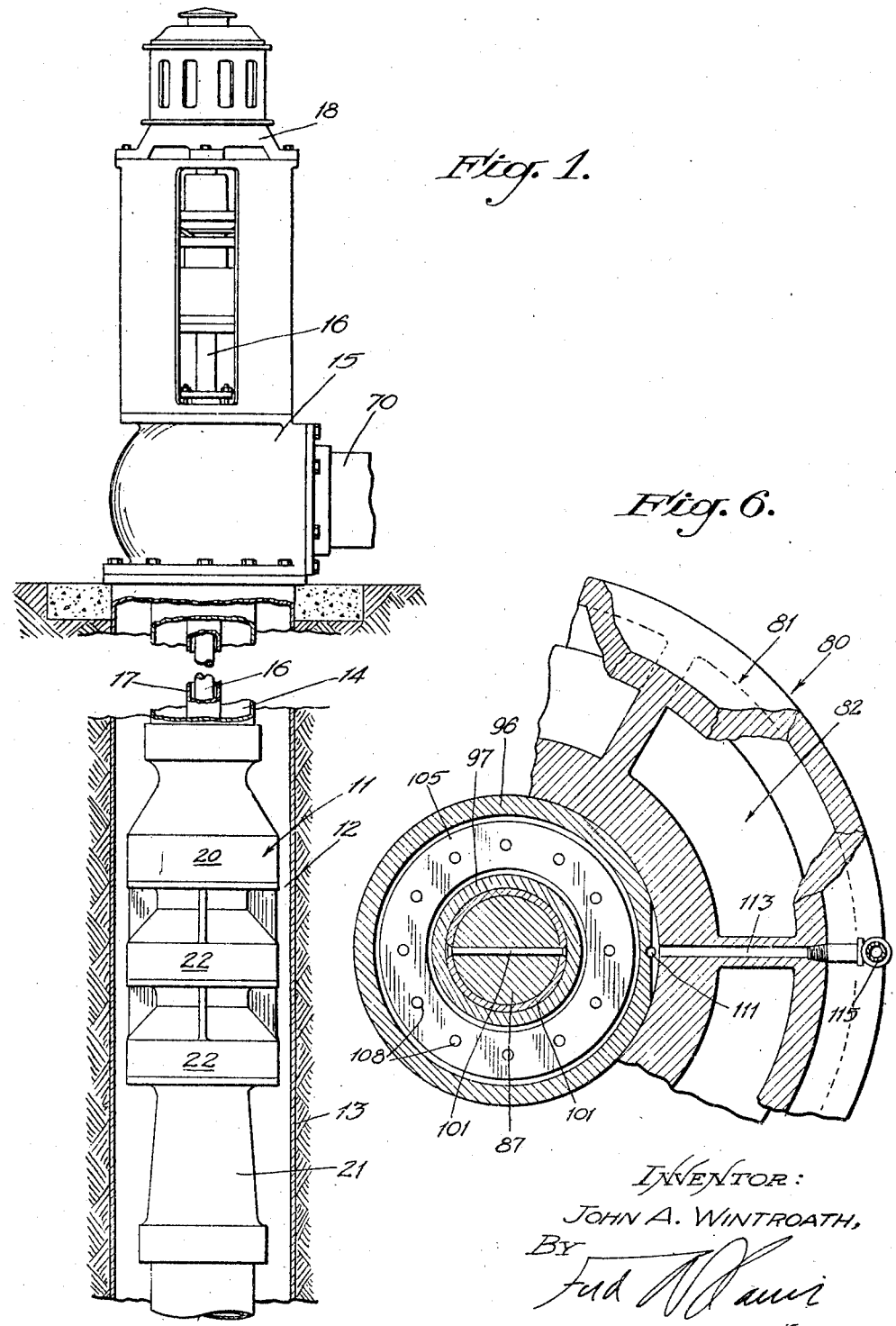

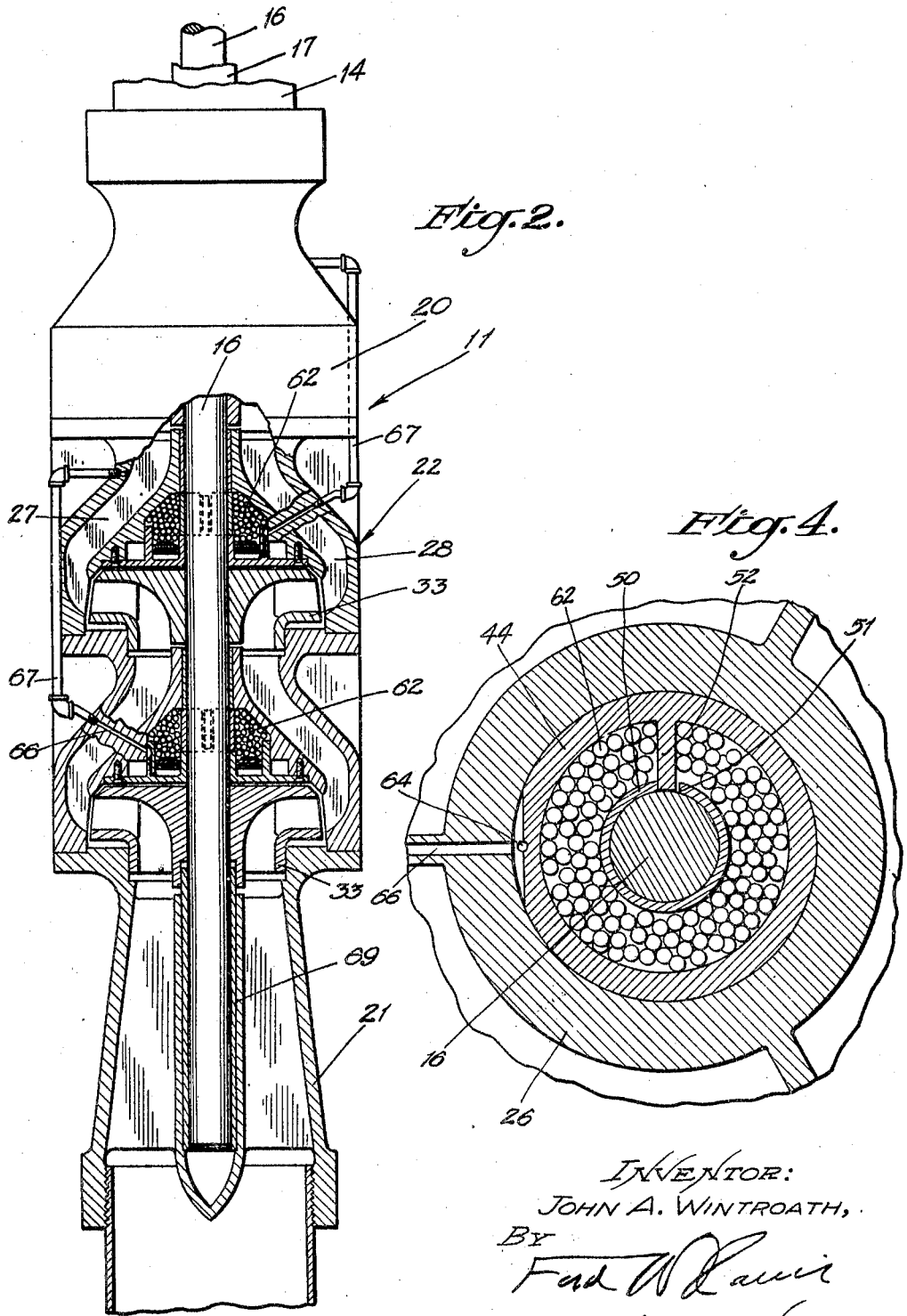

Feb. 9, 1932. J. A. WINTROATH 1,844,618
BEARING CONSTRUCTION FOR TURBINE IRRIGATION PUMPS
Filed July 30, 1925 3 Sheets-Sheet 3

INVENTOR:
JOHN A. WINTROATH,
BY
ATTORNEY.

Patented Feb. 9, 1932

1,844,618

UNITED STATES PATENT OFFICE

JOHN A. WINTROATH, OF LOS ANGELES, CALIFORNIA, ASSIGNOR TO PEERLESS PUMP COMPANY, OF LOS ANGELES, CALIFORNIA, A CORPORATION OF CALIFORNIA

BEARING CONSTRUCTION FOR TURBINE IRRIGATION PUMPS

Application filed July 30, 1925. Serial No. 46,980.

This invention relates to vertical turbine irrigation pumps and it particularly relates to a novel wear compensating bearing designed for employment in pumps of this character or on bearings for other machinery where the same problems are encountered.

A common type of turbine irrigation pump to which my invention is applicable comprises a pump section which is situated at the bottom of a well and which is attached to the lower end of a column pipe. The column pipe extends upward through the well and is attached to a pump head. Extending from the pump section to the pump head is a pump shaft through which the impellers of the pump section are driven. The pump section of such a pump comprises a plurality of stages in which the impellers are located. These impellers are secured to and rotated by the pump shaft. Bearings which are generally bronze-bushed are carried in the stages through which bearings the pump shaft extends. In the operation of this type of pump, considerable wear takes place between the bronze bushings and the pump shaft. This wear is magnified by the presence of sand or other abrasive matter in the water being pumped. Such wear allows considerable leakage and when this wear occurs to an appreciable extent a whipping of the impeller shaft occurs. The whipping of the impeller shaft moves the impeller through a gyrating path and causes much wear on certain parts thereof and upon the stage in which it is situated, causing a short-circuiting of water, that is, a leakage or return of water into a preceding stage. This short-circuiting greatly reduces the efficiency of the pump. When the bronze bushings and the shaft have worn, which can only be determined by a decrease in efficiency of the pump, the pump must be removed and the shaft and bushings replaced by new ones. Inasmuch as the pmp section is sometimes located 300 to 400 feet below the surface, it is quite an expensive task to remove the pump and replace the shaft and bushings.

It is an object of my invention to provide in a pump of this character a wear compensating bearing. This bearing is designed so that as it wears, compensation of this wear will take place, thus preventing appreciable leakage and entirely eliminating a whipping of the shaft.

Another object of my invention is to provide a wear compensating bearing of this character which is operated by hydraulic pressure. My invention has means by which the pressure of the water being pumped is utilized to retain the bearing in journaling engagement with the pump shaft.

Other objects and the especial advantages of my invention will be made evident hereinafter.

Referring to the three sheets of drawings in which I illustrate alternative forms of my invention and which are solely for the purpose of illustration, Fig. 1 is a view depicting the utility of my invention.

Fig. 2 is an enlarged view of a pump section partially sectioned, showing one form of my invention.

Fig. 4 is a fragmentary cross section taken on the line 4—4 of Fig. 3.

Fig. 6 is a section taken on the line 6—6 of Fig. 5.

Figures 3, 5:
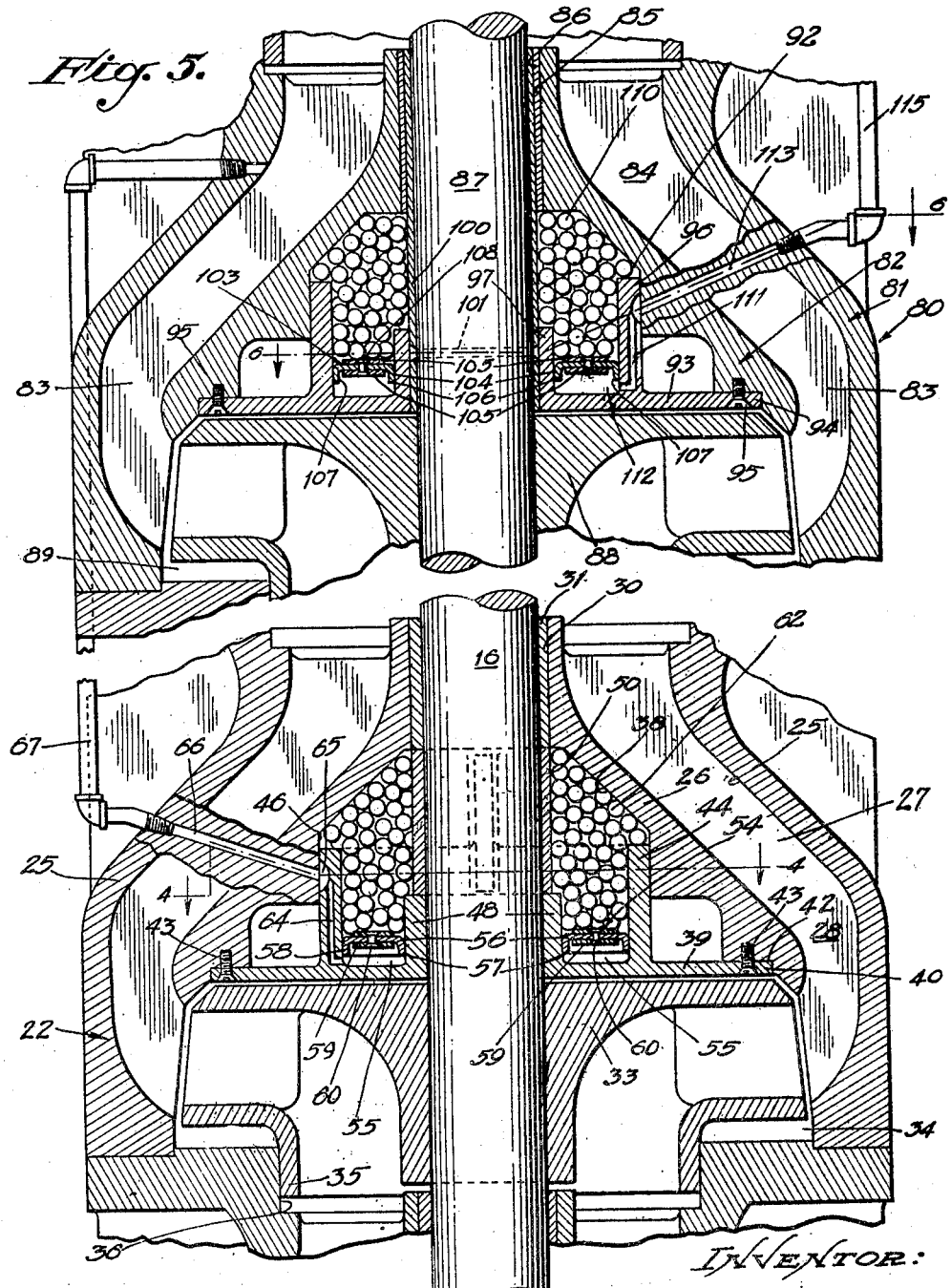
Fig. 3 is an enlarged section taken through a stage of the pump section shown in Fig. 2.
Fig. 5 is a cross section of a stage utilizing an alternative form of my invention.

With reference to the drawings and particularly to Fig. 1, 11 denotes a pump section situated at the lower end of a well 12 which has a well casing 13. The pump section 11 is attached to the lower end of a column pipe 14 which extends upward through the well 12 and is secured to a pump head 15. Extending from the pump section 11 is a pump shaft 16 which is surrounded by an oil tube 17. This pump shaft 16 is connected to the head 15 in such a manner that it is rotated by the motor 18 thereof.

With attention to Figs. 2, 3 and 4 the pump section 11 comprises an upper bearing section 20, a lower bearing section 21 and intermediate stages 22, all of which are rigidly secured together.

As shown clearly in Fig. 3 each stage 22 has an outer shell 25 and a core 26 which are separated to provide a water passage 27. Diffusion vanes 28 extend from the shell 25 to the core 26 through the space 27 and support the core 26. The core 26 has a cylindrical opening 30 which has a bushing 31. The pump shaft 16 extends entirely through the section 22 and has an impeller 33 rigidly secured thereto. The impeller 33 rests in an impeller chamber 34 of the section 22. A cylindrical lip 35 of the impeller 33 extends into a cylindrical opening 36 of an impeller section directly below the impeller section in which it is carried. A bearing or auxiliary chamber 38 is formed in the core 26 below the opening 30. The lower part of the bearing chamber 38 is defined by a cover 39. A flange 40 of the cover 39 is secured against a lower annular face 42 of the core 26 by threaded screws 43. An outer tube 44 extends upward from the flange 40 and extends into engagement with a cylindrical face 46 of the core 26. An inner tube 48 which projects upward from the flange 40 surrounds the pump shaft 16. Surrounding the shaft 16 between the inner tube 48 and the bushing 31 is a compensating bearing sleeve 50 as clearly shown in Fig. 4. The compensating bearing sleeve 50 is split at 51. A lug 52 formed in the bearing chamber 38 being a part of the core 26 extends into the split 51 and prevents a rotation of the compensating bearing sleeve 50. In an annular chamber 55 formed between the inner and outer tubes 48 and 44 is placed a compression member 54. This compression member 54 comprises an annular cup 56 having an inner lip 57 which engages the outer cylindrical face of the inner tube 48 and an outer lip 58 which engages an inner cylindrical face of the outer tube 44. The web portion of the cup 56 is supported by plates 59 which are secured in place by rivets 60. Placed above the compression member 54 in the chamber 38 is a pressure medium comprising a mobile or displaceable mass preferably in the form of small steel balls 62.

A passage 64 of the outer tube 44 connects with that portion of the bearing chamber 38 below the compression member 54. The upper end of the passage 64 is enlarged at 65 and is in communication with an opening 66 formed in the stage 22, extending through the shell 25, one of the diffusion vanes 28 and through the outer wall of the core 26. As shown clearly in Fig. 2 a pipe 67 connects with the opening 66, this pipe extending into communication with the water passage of a higher impeller section 22. The lower end of the pump shaft 16 is rotatably supported in a foot bearing 69 of the lower bearing stage 21.

The operation of the pump just described is substantially as follows:

The energization of the motor 18 rotates the pump shaft 16 and the impellers 33 secured thereon. Water is drawn through the lower bearing section 21 into the lower impeller 33. Water is centrifugally thrown by the lower impeller 33 into the water passage 27 of this stage 22. The water is forced through this stage 22 and passes into the impeller 33 of the next stage 22. The water is again thrown centrifugally outward by this impeller 33 and is forced through the passage 27 of this stage 22 and through the upper bearing section 20. Thereafter this water is moved upwardly from the pump section 11 through the column pipe 14 and into the pump head 15 whence it is discharged through a discharge pipe 70 to suitable storage or place of use. The water pressure in a pump section located about 200 feet below the ground is approximately ninety pounds per square inch. Water passing through the water passage 27 of the upper stage 22 passes through the pipe 67, the opening 66 and the passage 64 into the space below the compression member 54 of the lower stage 22. The water pressure in this space forces the compression member 54 upwardly, exerting a compressive force on the steel balls 62. These steel balls 62 in turn exert a compressive force on the compensating bearing sleeve 50 and retain it in journaling engagement with the shaft 16. As the compensating bearing sleeve 50 wears, it is forced inwardly by the pressure of the steel balls thereon and this wear is compensated for.

My invention provides a bearing arrangement which is always in proper adjustment. Therefore, the leakage from the stages of the pump will be a minimum. Further, by always maintaining a proper adjustment of bearing there will be no whipping in the pump shaft 16. In the common type of pump, when the bearings of the stages wear, the shaft will whip as previously mentioned. This allows the impeller sections to assume a gyrating path which causes considerable wear between the parts equivalent to the lip 35 and the cylindrical face 36, as shown in Fig. 3. The wearing of these parts creates a space between the impeller and the section through which space water may short-circuit. Water passing through this space is continuously passed through the same impeller and the efficiency of the pump is decreased. Such wear is obviated by my invention. The pressure exerted against the compensating bearing sleeve 50 may be varied by using different proportions in the construction; for example, the compression member 54 may be made of a larger or smaller surface arrangement as desired. Also, the part of the bearing chamber 38 below the compression member 54 may be in communication with the water passage of the same section or the next section above or in fact any section as desired.

In Figs. 5 and 6 I show another form of my invention. In this modification I utilize a section 80 having a shell 81 and a core 82 between which a water passage 83 is formed, the shell and core 81 and 82 being joined together by diffusion vanes 84. An opening 85 of the core 82 is bushed with a bushing 86. Extending through the bushing 86 is a pump shaft 87. The pump shaft 87 has an impeller 88 secured thereto which impeller 88 is situated in an impeller chamber 89. The core 82 has a bearing chamber 92 which is closed by a cover 93, this cover 93 having a flange 94 through which screws 95 extend for securing it to the core 82. Extending concentrically upwardly from the cover 93 are an outer tube 96 and an inner tube 97. The pump shaft 87 is provided with a bearing sleeve 100 which is secured thereto by a rivet 101. This bearing sleeve 100 is so positioned and is of such a size that it extends through the bearing bushing 86, the bearing chamber 92 and the inner tube 97 of the cover 93. Placed in the annular space between the outer and inner tubes 96 and 97 is a compression member 103 which is composed of an annular cup 104 and reinforcing members 105. The annular cup 104 has an inner and an outer lip 106 and 107 which respectively engage the outer cylindrical face of the inner tube 97 and the inner cylindrical face of the outer tube 96. The supporting plates 105 are secured to the web portion of the annular cup 103 by rivets 108. A bearing construction 110 is placed in the bearing chamber 92. This bearing construction 110 is preferably provided in the form of anti-friction balls which may be made from bearing material such as babbitt. A passage 111 communicates with a space 112 of the bearing chamber 92 below the compression member 103. This passage 111 is connected with an opening 113 of the section 80 which opening 113 has a pipe 115 connected thereto. Hydraulic pressure is supplied through the pipe 115, the opening 113 and the passage 111 into the space 112. This hydraulic pressure forces the compression member 103 upward, compressing the bearing material 110. The anti-friction balls by this hydraulic pressure are forced into journaling engagement with the bearing sleeve 100. As the balls wear, they are forced inwardly to compensate for this wear and an adjustment of the bearing is uniformly maintained at all times. This modification of my invention eliminates the stationary bearing bushing 50 and employs the bearing sleeve 100. In this modification there is no wear on the shaft 87, all the wear being taken by the bearing sleeve 100 which may be readily replaced.

From the foregoing description it will be seen that my invention will eliminate a great deal of trouble in the pump. The efficiency of the pump will be maintained by preventing wear on certain parts and by preventing a leakage.

I claim as my invention:

1. In a turbine pump, the combination of: walls defining a bearing chamber; a rotatable member extending into said bearing chamber; a bearing means in said bearing chamber; and means operative as a function of the pressure developed by said pump for forcing said bearing means into journalling relationship with said rotatable member.

2. In a turbine pump, the combination of: a series of pump stages, each stage having an impeller chamber, and a bearing chamber; a rotatable member extending through said bearing chambers; an impeller secured to said rotatable member located in each of said impeller chambers; a bearing in one of said bearing chambers; and hydraulically operated means for compressively holding said bearing in journaling engagement with said rotatable member, said means being operable by the fluid pressure in another stage of said pump.

3. In a turbine pump, the combination of: a pump stage having an impeller chamber and a bearing chamber; a rotatable member extending through said bearing chamber; an impeller secured to said rotatable member and located in said impeller chamber; a bearing in said bearing chamber; a cover for said bearing chamber; and a compression means arranged in said bearing chamber whereby said bearing is held in journaling engagement with said rotating member, said compression means being operated by hydraulic pressure supplied thereto by a passage formed in said pump stage.

4. In a turbine pump, the combination of: a pump stage having an impeller chamber and a bearing chamber; a rotatable member extending through said bearing chamber; an impeller secured to said rotatable member and located in said impeller chamber; a deformable mass in said bearing chamber; a cover for said bearing chamber having an outer tube engaging a cylindrical face of said bearing chamber, and an inner tube surrounding said rotatable member, there being a passage joined to one part of said bearing chamber whereby hydraulic pressure is supplied thereto; and compression means situated in said bearing chamber and actuated by said hydraulic pressure to compress said deformable mass in said bearing chamber.

5. In a turbine pump, the combination of: a pump stage having an impeller chamber and a bearing chamber; a rotatable member extending through said bearing chamber; an impeller secured to said rotatable member and located in said impeller chamber; a bearing comprised of a single sleeve member, said bearing being disposed in said bearing chamber; and means operated by the fluid pressure in said pump for holding the entire bearing surface of said bearing in journaling engagement with said rotatable member.

6. In a turbine pump, the combination of: a pump stage having an impeller chamber and a bearing chamber; a rotatable member extending through said bearing chamber; an impeller secured to said rotatable member and located in said impeller chamber; a bearing comprised of a single sleeve member split longitudinally, said bearing being disposed in said bearing chamber; and means operated by the fluid pressure in said pump for holding the entire bearing surface of said bearing in journaling engagement with said rotatable member.

7. In a turbine pump, the combination of: a pump stage having an impeller chamber and a bearing chamber; a rotatable member extending through said bearing chamber; an impeller secured to said rotatable member and located in said impeller chamber; a bearing comprised of a single sleeve member split longitudinally, said bearing being disposed in said bearing chamber; means extending into the split portion of said bearing for preventing rotation thereof; and a mobile mass compressed by the pressure of the fluid being pumped for holding the entire bearing surface of said bearing in journaling engagement with said rotatable member.

8. In combination in a multi-stage turbine pump providing a plurality of pump stages through which fluid is pumped in succession: walls forming a bearing chamber; a rotatable member extending into said bearing chamber; a deformable mass of material substantially filling said bearing chamber around said rotatable member; a fluid-actuated means for compressing said mass of material in said bearing chamber; and means for supplying fluid to said fluid-actuated means from a pump stage in which the pressure is higher than the pressure adjacent said bearing chamber.

9. In a turbine pump, the combination of: a pump stage having an impeller chamber and a bearing chamber; a rotatable member extending through said bearing chamber; an impeller secured to said rotatable member and located in said impeller chamber; a bearing comprised of a single sleeve member, said bearing being disposed in said bearing chamber; and means for holding the entire bearing surface of said bearing in journaling engagement with said rotatable member, said last named means comprising a deformable mass of material compressibly confined in said bearing chamber and actuated by hydraulic pressure derived from another stage of said pump.

10. In a turbine pump, the combination of: a pump stage having an impeller chamber and a bearing chamber; a rotatable member extending into said bearing chamber; an impeller secured to said rotatable member in said impeller chamber; a bearing sleeve in said bearing chamber, said sleeve journalling said rotatable member; a mobile mass in said bearing chamber surrounding said sleeve; and a piston adapted to bear against said mobile mass to exert a pressure against said sleeve, said pressure being exerted in proportion to the pressure in said pump.

11. In a turbine pump, the combination of: a pump stage having an impeller chamber and a bearing chamber; a rotatable member extending into said bearing chamber; an impeller secured to said rotatable member in said impeller chamber; a bearing sleeve in said bearing chamber, said sleeve journalling said rotatable member; a cover for said bearing chamber, said cover having an annular chamber; a piston adapted to slide in said annular chamber; and a mobile mass in said bearing chamber surrounding said sleeve, said piston being operable to compress said mobile mass to hold said sleeve in journalling engagement with said rotatable member.

12. In a turbine pump, the combination of: a pump stage having an impeller chamber and a bearing chamber; a rotatable member extending into said bearing chamber; an impeller secured to said rotatable member in said impeller chamber; a bearing sleeve in said bearing chamber, said sleeve journalling said rotatable member; a cover for said bearing chamber, said cover having an annular chamber; a pressure-transferring means extending across said chamber; and a mobile mass in said bearing chamber surrounding said sleeve, said pressure-transferring means being operable to compress said mobile mass to hold said sleeve in journalling engagement with said rotatable member with a pressure which is a function of the pressure in said pump.

13. In combination: walls forming a fluid passage; walls forming a bearing chamber; a rotatable member in said chamber; a sleeve bearing in said bearing chamber, said sleeve bearing being adapted to journal said rotatable member with a variable pressure; a mobile mass pressurally engaging said sleeve bearing; and means for compressing said mobile mass with a pressure which is a function of the pressure of a fluid in said fluid passage.

14. In combination: walls defining a bearing chamber; a rotatable member extending into said chamber; a split bearing sleeve in said chamber in journalling relationship with said rotatable member; a lug extending from said walls and into the split of said bearing sleeve; a deformable mass of material in said bearing chamber around said sleeve and said lug; and fluid actuated pressure means engaging said deformable mass to control the journalling pressure between said bearing means and said rotatable member.

15. In combination: walls defining a bearing chamber; a rotatable member extending into said bearing chamber; bearing means in said chamber and adapted to journal said shaft; auxiliary walls defining an annular chamber around said rotatable member; pressure-transferring means extending between said auxiliary walls in fluid-tight relationship therewith; a deformable mass of material substantially filling said bearing chamber and in pressure-transferring relationship with said pressure-transferring means and with said bearing means; and means for increasing the pressure on said pressure-transferring means to increase the journalling engagement between said bearing means and said rotatable element.

16. In a turbine pump, the combination of: a pump stage providing a bearing chamber; a rotatable member extending through said bearing chamber; an impeller carried by said rotatable member and pumping a fluid through said pump stage; a mass of deformable material in said bearing chamber around said rotatable member; and a pressure-transferring member separating said fluid from said mass of deformable material, one surface of said pressure-transferring member contacting said fluid and the other surface thereof contacting said mass of deformable material to compress it in said bearing chamber.

17. In a turbine pump, the combination of: a pump stage having an impeller chamber and an auxiliary chamber; a rotatable member extending through said auxiliary chamber; an impeller on said rotatable member in said impeller chamber; a deformable mass of material substantially filling said auxiliary chamber around said rotatable member; and means operated by the fluid pressure in said pump for compressing said deformable mass in said auxiliary chamber in journalling engagement with said rotatable member.

18. In a pump, the combination of: a pump stage having two chambers; a rotatable member extending into both of said chambers; an impeller secured to said rotatable member in one of said chambers; a deformable mass substantially filling the other of said chambers; a cover member separating said chambers, said cover member providing stationary inner and outer walls around said rotatable member; and compression means extending between said inner and outer walls, one side of said compression means transmitting pressure to said deformable mass, said cover member providing a passage supplying hydraulic pressure to the other side of said compression means to compress said deformable mass as a function of the pressure developed in said pump.

In testimony whereof, I have hereunto set my hand at Los Angeles, California, this 24th day of July, 1925.

JOHN A. WINTROATH.